United States Patent
Sun

(10) Patent No.: US 8,856,429 B2
(45) Date of Patent: Oct. 7, 2014

(54) DATA STORAGE DEVICE BASED ON SPI AND ITS CONTROLLING METHOD

(75) Inventor: Yinming Sun, Chengdu (CN)

(73) Assignee: IPGoal Microelectronics (SiChuan) Co., Ltd, Chengdu, Sichuan Province (CN)

( * ) Notice: Subject to any disclaimer, the term of this patent is extended or adjusted under 35 U.S.C. 154(b) by 262 days.

(21) Appl. No.: 13/454,095

(22) Filed: Apr. 24, 2012

(65) Prior Publication Data

US 2013/0054879 A1 Feb. 28, 2013

(30) Foreign Application Priority Data

Aug. 24, 2011 (CN) .......................... 2011 1 0243662

(51) Int. Cl.
*G06F 12/00* (2006.01)
*G06F 12/02* (2006.01)
(52) U.S. Cl.
CPC ...................................... *G06F 12/02* (2013.01)
USPC ........................................................ 711/103

(58) Field of Classification Search
CPC ........................ G06F 12/0238; G06F 12/0246
See application file for complete search history.

(56) References Cited

U.S. PATENT DOCUMENTS

| | | | |
|---|---|---|---|
| 8,549,246 B2 * | 10/2013 | Pekny et al. | 711/163 |
| 2006/0277337 A1 * | 12/2006 | Chuang et al. | 710/62 |
| 2009/0276561 A1 * | 11/2009 | Pekny et al. | 711/103 |

* cited by examiner

*Primary Examiner* — Brian Peugh

(57) ABSTRACT

A data storage device based on SPI includes an SPI circuit, a NAND flash memory for storing data, a NAND flash interface connected between the SPI interface and the NAND flash memory for controlling data transmission therebetween, an instruction controlling circuit connected between the SPI circuit and the NAND flash memory interface for converting an instruction received by the SPI circuit into an instruction recognizable to the NAND flash memory and a data converting circuit connected between the SPI circuit and the NAND flash memory interface for accomplishing conversion between serial data and parallel data. A data storage controlling method based on SPI is also disclosed. Thus a relatively small capacity and a relatively high price of a NOR flash memory based on SPI are avoided and costs are saved.

10 Claims, 3 Drawing Sheets

DATA STORAGE DEVICE BASED ON SPI AND ITS CONTROLLING METHOD

BACKGROUND OF THE PRESENT INVENTION

1. Field of Invention

The present invention relates to a data storage device and its controlling method, and more particularly to a high-capacity data storage device based on Serial Peripheral Interface (SPI) and its controlling method.

2. Description of Related Arts

An SPI bus system is a synchronizing serial peripheral interface and able to allow the Micro Control Unit (MCU) to communicate with various external devices in a serial method to exchange information.

NOR flash memory and NAND flash memory are two main non-volatile computer memory technologies on the market. The NOR flash memory based on SPI is widely applied in various data storage systems because of its few interface signals, high speed and long service life. But the NOR flash memory has a relatively small capacity and a comparatively high price, and thus the NOR flash memory is only applied in small-capacity data storage systems. Thus it is necessary to provide a high-capacity data storage device based on SPI to replace the NOR flash memory based on SPI and also to save costs.

The NAND flash memory has a big capacity, a fast speed and a low price. Thus it is necessary to provide a NAND flash memory based on SPI to overcome disadvantages of the relatively small capacity and the relatively high price of the NOR flash memory based on SPI.

SUMMARY OF THE PRESENT INVENTION

Thus it is necessary to provide a high-capacity data storage device based on SPI and its controlling method.

The data storage device based on SPI comprises an SPI circuit, a NAND flash memory for storing data, a NAND flash memory interface connected between the SPI circuit and the NAND flash memory for controlling data transmission therebetween, an instruction controlling circuit connected between the SPI circuit and the NAND flash memory interface for converting instructions received by the SPI circuit into instructions recognizable to the NAND flash memory and a data converting circuit connected between the SPI circuit and the NAND flash memory interface for accomplishing conversion between serial data and parallel data.

The data storage controlling method based on SPI comprises following steps:

receiving serial data and an operational instruction by an SPI circuit;

converting the serial data received by the SPI circuit into parallel data by a data converting circuit;

resolving the operational instruction received by the SPI circuit by an instruction resolving module and judging whether the resolved operational instruction needs a high-capacity flash memory extension or not by a high-capacity extension instruction module; when yes, going on as follows;

extending an address of the resolved operational instruction by the high-capacity extension instruction module;

converting the extended operational instruction into an operational instruction recognizable to a NAND flash memory by an instruction converting module; and sending the operational instruction converted by the instruction converting module into the NAND flash memory through a NAND flash memory interface by an instruction executing module.

Compared to conventional arts, the present invention not only takes advantage of a convenient SPI, but also maintains a high capacity of a NAND flash memory, so as to avoid a relatively small capacity and a relatively high price of a NOR flash memory based on SPI and to save costs.

DETAILED DESCRIPTION OF THE PREFERRED EMBODIMENT

Figure 1:
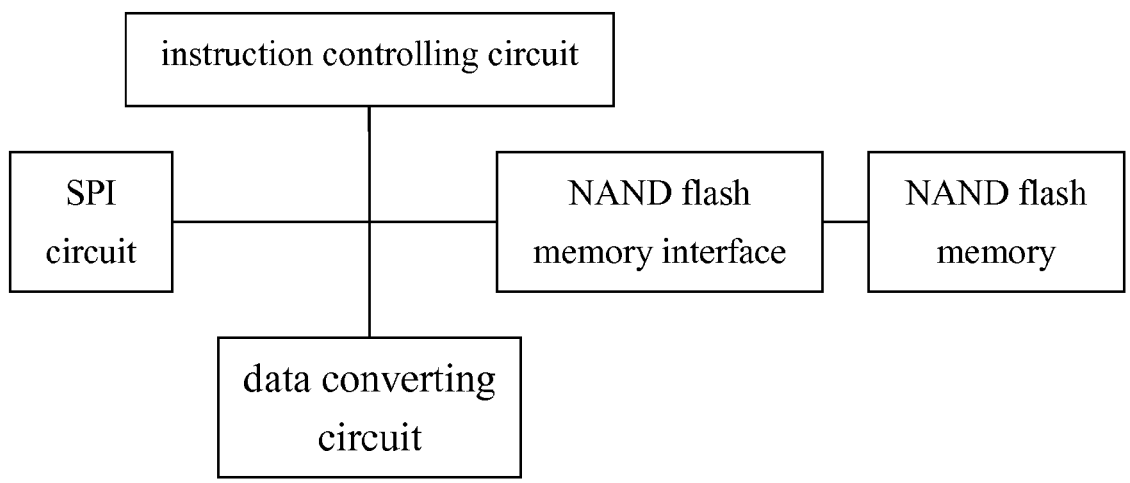
FIG. 1 is a block diagram of a data storage device based on SPI according to a preferred embodiment of the present invention.

Referring to FIG. 1 of the drawings, according to a preferred embodiment of the present invention, a data storage device based on SPI comprises an SPI circuit, a NAND flash memory interface connected to the SPI circuit, an instruction controlling circuit connected between the SPI circuit and the NAND flash memory interface, a data converting circuit connected between the SPI circuit and the NAND flash memory interface and a NAND flash memory connected to the NAND flash memory interface.

The SPI circuit is for transmitting data based on SPI with a master device. The NAND flash memory interface is for generating a controlling timing sequence of the NAND flash memory and transmitting data between the SPI circuit and the NAND flash memory. The instruction controlling circuit is for converting instructions received by the SPI circuit into instructions recognizable to the NAND flash memory to control the NAND flash memory. The data converting circuit is for converting serial data received by the SPI circuit into parallel data and converting parallel data received by the NAND flash memory interface into serial data. The NAND flash memory, as a high-capacity memory bank, is for storing data and may have a capacity between 32 MB and 2 GB.

Figure 2:
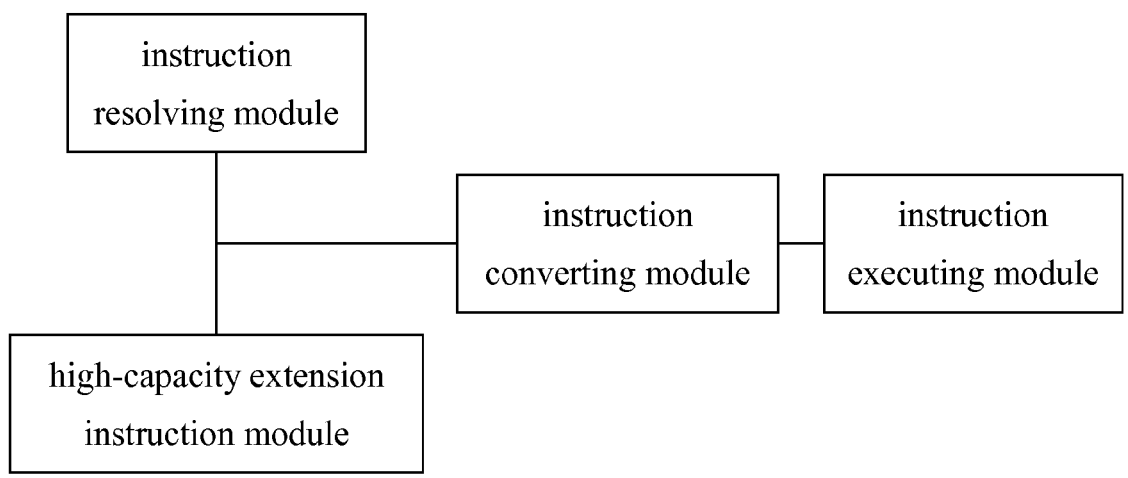
FIG. 2 is a block diagram of an instruction controlling circuit of FIG. 1.

According to the preferred embodiment of the present invention, FIG. 2 shows a block diagram of an instruction controlling circuit. The instruction controlling circuit comprises an instruction resolving module, a high-capacity extension instruction module connected to the instruction resolving module, an instruction converting module connected to the instruction resolving module and the high-capacity extension instruction module and an instruction executing module connected to the instruction converting module.

The instruction resolving module is for resolving standard operational instructions received by the SPI circuit, such as reading data, writing data, erasing data, reading state. The high-capacity extension instruction module is for judging whether the operational instruction resolved by the instruction resolving module needs a high-capacity flash memory extension and, when yes, expanding an address of the operational instruction to enlarge a covering range and make full use of a storage capacity of the NAND flash memory; and, when no, directly sending the operational instruction resolved by the instruction resolving module into the instruction converting module. The instruction converting module is for converting the instructions resolved by the instruction resolving module and the instructions expanded by the high-capacity extension instruction module into instructions recognizable to the NAND flash memory. The instruction executing module is for sending the instruction converted by the instruction converting module into the NAND flash memory through the NAND flash memory interface.

A high-capacity NAND flash memory device based on SPI can be obtained according to the data storage device based on SPI of the present invention. The present invention takes advantage of a convenient SPI and maintains a high capacity of NAND flash memory, so as to avoid a relatively small capacity and a relatively high price of a NOR flash memory based on SPI and to save costs.

Figure 3:
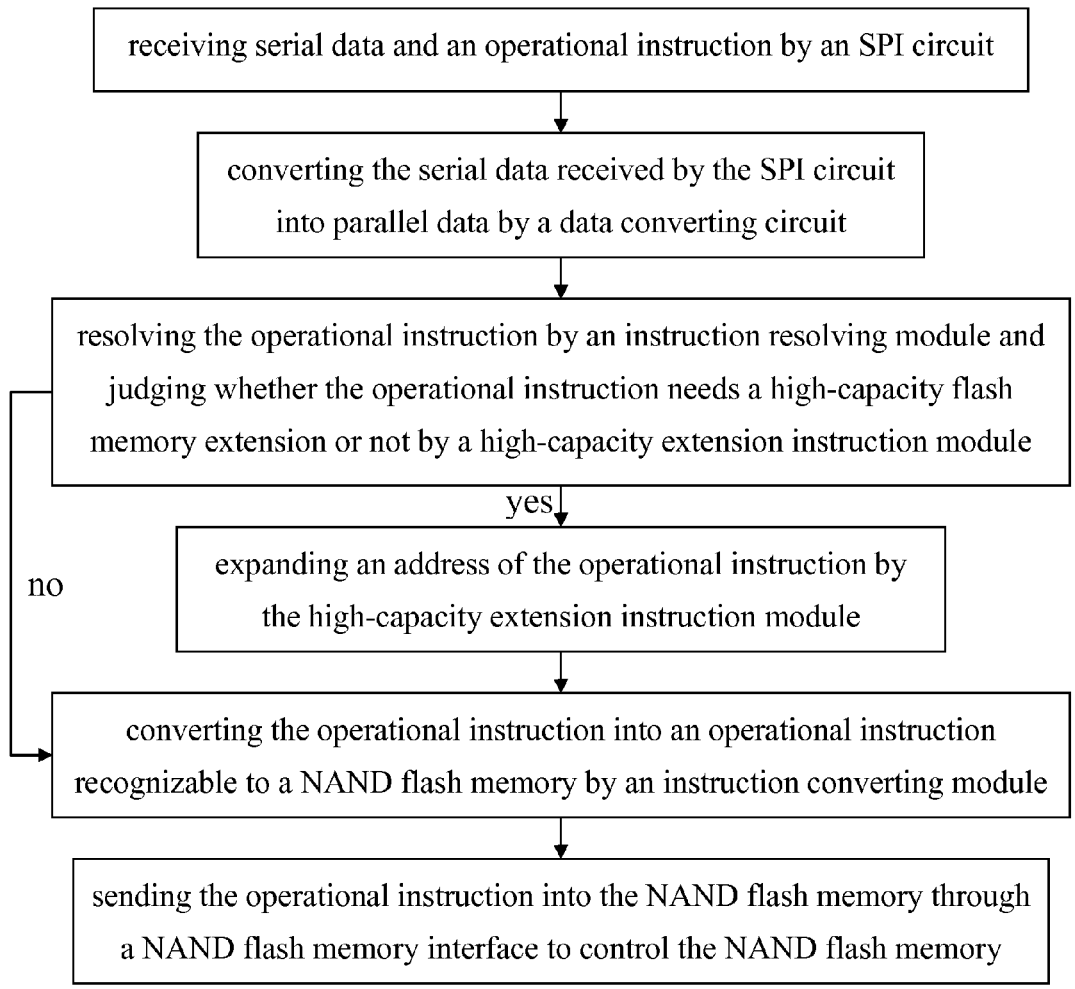
FIG. 3 is a flow chart of a data storage controlling method based on SPI according to the preferred embodiment of the present invention.

Referring to FIG. 3, according to the preferred embodiment of the present invention, a data storage controlling method based on SPI comprises following steps:

step one, receiving serial data and an operational instruction by an SPI circuit, such as reading data, writing data, erasing data and reading state;

step two, converting the serial data received by the SPI circuit into parallel data by a data converting circuit;

step three, resolving the operational instruction received by the SPI circuit by an instruction resolving module in an instruction controlling circuit and judging whether the operational instruction needs a high-capacity flash memory extension or not by a high-capacity extension instruction module; when yes, going to step four; when no, going to step five;

step four, expanding an address of the operational instruction by the high-capacity extension instruction module;

step five, converting the operational instruction into a corresponding operational instruction recognizable to a NAND flash memory by an instruction converting module; and step six, sending the operational instruction converted by the instruction converting module into the NAND flash memory through a NAND flash memory interface to control the NAND flash memory.

For example, by sending an instruction of reading data to the data storage device based on SPI with the data storage controlling method based on SPI, then reading data of an appointed length from the NAND flash memory through the NAND flash memory interface and converting parallel data into serial data by the data converting circuit and finally sending the data out from the SPI circuit, it is accomplished to read data from the data storage device based on SPI; by sending an instruction of writing data to the data storage device based on SPI with the data storage controlling method based on SPI, then sending data of an appointed length into the SPI circuit and converting serial data into parallel data by the data converting circuit and finally sending the data into the NAND flash memory through the NAND flash memory interface, it is accomplished to write data into the data storage device based on SPI.

In a data collecting system, in order to add new external storage devices, by adopting the present invention, it becomes very convenient to expand a high-capacity storage device, which is known as a simple operation and an easy installing; wherein a standard SPI driver can be adopted. In a data storage system using SPI, because of a complicated design of the system, it is necessary to greatly enlarge a storage capacity. By adopting the present invention, not only an original system frame becomes compatible, but also the storage capacity is greatly enlarged and a system cost is saved.

The present invention not only takes advantage of the convenient SPI but also maintains the high capacity of the NAND flash memory, so as to solve problems of a relatively small capacity and a relatively high price of the NOR flash memory based on SPI and save costs.

What is claimed is:

1. A data storage device based on SPI, comprising an SPI circuit, a NAND flash memory for storing data, a NAND flash memory interface connected between said SPI circuit and said NAND flash memory for controlling data transmission therebetween, an instruction controlling circuit connected between said SPI circuit and said NAND flash memory interface for converting instructions received by said SPI circuit into instructions recognizable to said NAND flash memory and a data converting circuit connected between said SPI circuit and said NAND flash memory interface for accomplishing conversion between serial data and parallel data;

wherein said instruction controlling circuit comprises an instruction resolving module for resolving operational instructions received by said SPI circuit, a high-capacity extension instruction module connected to said instruction resolving module, an instruction converting module connected to said instruction resolving module and said high-capacity extension instruction module and an instruction executing module connected to said instruction converting module.

2. The data storage device based on SPI, as recited in claim 1, wherein said SPI circuit receives the operational instructions including reading data, writing data, erasing data and reading state.

3. The data storage device based on SPI, as recited in claim 2, wherein said high-capacity extension instruction module is for judging whether the operational instruction resolved by said instruction resolving module needs a high-capacity flash memory extension and, when yes, expanding an address of the operational instruction; when no, directly sending the operational instruction resolved by said instruction resolving module into said instruction converting module.

4. The data storage device based on SPI, as recited in claim 3, wherein said instruction converting module is for converting the instruction resolved by said instruction resolving module and the instruction expanded by said high-capacity extension instruction module into the instruction recognizable to said NAND flash memory.

5. The data storage device based on SPI, as recited in claim 4, wherein said instruction executing module is for sending the instruction converted by said instruction converting module into said NAND flash memory through said NAND flash memory interface.

6. The data storage device based on SPI, as recited in claim 1, wherein said high-capacity extension instruction module is for judging whether the operational instruction resolved by said instruction resolving module needs a high-capacity flash memory extension and, when yes, expanding an address of the operational instruction; when no, directly sending the operational instruction resolved by said instruction resolving module into said instruction converting module.

7. The data storage device based on SPI, as recited in claim 6, wherein said instruction converting module is for converting the instruction resolved by said instruction resolving module and the instruction expanded by said high-capacity extension instruction module into the instruction recognizable to said NAND flash memory.

8. The data storage device based on SPI, as recited in claim 7, wherein said instruction executing module is for sending the instruction converted by said instruction converting module into said NAND flash memory through said NAND flash memory interface.

9. A data storage controlling method based on SPI comprising steps of:

receiving serial data and an operational instruction by an SPI circuit;

converting the serial data received by the SPI circuit into parallel data by a data converting circuit;

resolving the operational instruction received by the SPI circuit by an instruction resolving module and judging whether the resolved operational instruction needs a high-capacity flash memory extension or not by a high-capacity extension instruction module and, when yes, going on as follows;

expanding an address of the resolved operational instruction by the high-capacity extension instruction module;

converting the expanded operational instruction into an operational instruction recognizable to a NAND flash memory by an instruction converting module; and sending the operational instruction converted by the instruction converting module into the NAND flash memory through a NAND flash memory interface by an instruction executing module; and judging whether the resolved operational instruction needs a high-capacity flash memory extension or not by a high-capacity extension instruction module and, when no, directly converting the resolved operational instruction into the operational instruction recognizable to the NAND flash memory by the instruction converting module.

10. The data storage controlling method based on SPI, as recited in claim 9, wherein the SPI circuit receives the operational instructions including reading data, writing data, erasing data and reading state.

* * * * *